(12) United States Patent
Pschierer et al.

(10) Patent No.: US 12,314,061 B2
(45) Date of Patent: May 27, 2025

(54) VEHICLE DATA VALIDATION SYSTEMS AND METHODS

(71) Applicant: THE BOEING COMPANY, Chicago, IL (US)

(72) Inventors: Christian Karl Pschierer, Ochsenfurt (DE); Kyle Phillips, Neu-Isenburg (DE)

(73) Assignee: THE BOEING COMPANY, Chicago, IL (US)

( * ) Notice: Subject to any disclaimer, the term of this patent is extended or adjusted under 35 U.S.C. 154(b) by 286 days.

(21) Appl. No.: 17/967,057

(22) Filed: Oct. 17, 2022

(65) Prior Publication Data

US 2024/0126273 A1    Apr. 18, 2024

(51) Int. Cl.
*G05D 1/00* (2024.01)

(52) U.S. Cl.
CPC .......... *G05D 1/104* (2013.01); *G05D 1/0094* (2013.01); *G05D 1/106* (2019.05)

(58) Field of Classification Search
CPC ...... G05D 1/104; G05D 1/0094; G05D 1/106; G08G 5/0013; G08G 5/0052; G08G 5/0056; G08G 5/0021
USPC ............................................................ 701/3
See application file for complete search history.

(56) References Cited

U.S. PATENT DOCUMENTS

| 7,706,971 | B2 | 4/2010 | Jaugilas et al. | |
|---|---|---|---|---|
| 9,969,486 | B1* | 5/2018 | O'Brien | G01J 5/53 |
| 10,380,694 | B1* | 8/2019 | Grant | G08G 1/012 |
| 11,557,213 | B1* | 1/2023 | Curlander | G08G 5/006 |
| 2016/0280224 | A1* | 9/2016 | Tatourian | B60W 40/076 |
| 2016/0328982 | A1* | 11/2016 | Jeong | G01S 19/48 |
| 2017/0162065 | A1* | 6/2017 | Scacchi | G08G 5/54 |
| 2018/0196107 | A1* | 7/2018 | Fleischer | G01R 31/367 |
| 2019/0176862 | A1* | 6/2019 | Kumar | B61L 25/025 |
| 2020/0043350 | A1* | 2/2020 | Cantrell | G08G 5/0091 |
| 2020/0388167 | A1* | 12/2020 | Chase | G08G 5/0034 |
| 2021/0020056 | A1* | 1/2021 | Chenchu | G08G 5/0021 |
| 2021/0072770 | A1* | 3/2021 | Kwon | G05D 1/101 |
| 2021/0082208 | A1* | 3/2021 | Surace | G08G 5/0091 |
| 2021/0089055 | A1* | 3/2021 | Tran | H10D 30/6723 |
| 2021/0090446 | A1* | 3/2021 | Rab | G08G 5/0013 |
| 2021/0192405 | A1* | 6/2021 | Bristow | G08G 5/0069 |
| 2021/0331798 | A1* | 10/2021 | Yi | G08G 5/006 |
| 2022/0139237 | A1* | 5/2022 | Niihata | H04W 40/12 455/450 |
| 2022/0238026 | A1* | 7/2022 | Ushiro | G01S 19/14 |

* cited by examiner

*Primary Examiner* — Tuan C To
*Assistant Examiner* — Dominick Mulder
(74) *Attorney, Agent, or Firm* — Mary D. Lawlor; The Small Patent Law Group, LLC

(57) ABSTRACT

A system and a method include a control unit including one or more processors configured to receive first data associated with expected movement of a vehicle system and second data associated with actual movement of the vehicle system. The control unit is configured to compare the first and second data to determine one or more differences between the first and second data. A responsive action is initiated by the control unit responsive to determining that the one or more differences are outside a designated threshold.

20 Claims, 3 Drawing Sheets

VEHICLE DATA VALIDATION SYSTEMS AND METHODS

FIELD OF THE DISCLOSURE

Examples of the present disclosure generally relate to systems and methods for validating vehicle navigational data.

BACKGROUND OF THE DISCLOSURE

Vehicles, such as aerial vehicles, may be operated based on expected navigational data associated with runways, arrivals, approach and departure procedures, enroute airways, airspaces, and other related details. The navigational data may be created and/or updated with information that is received from governmental sources, such as the Federal Aviation Administration (FAA), from an Aeronautical Information Publication (AIP), from a Notice to Air Missions (NOTAM) notification publication, etc. The updated information may be related to changes in restricted airspace, updates to airports, etc.

Pilots may control operation of an aircraft by blindly following navigational data or navigational protocols that have been generated. However, the navigational protocols may be outdated, may be obsolete, may be based on other types of aircraft systems, or the like. In some circumstances, the air traffic controller may instruct pilots to manually deviate from an operational setting of a navigational protocol, such as because the protocol is no longer accurate, is no longer relevant, etc., but then fail to update the navigational protocol.

SUMMARY OF THE DISCLOSURE

A need exists for a system and a method for validating navigational protocols, and effectively updating or revising the navigational protocols. Further, a need exists for a system and a method that improves the accuracy of navigational protocols which pilots may use to control operation of an aerial vehicle system.

With those needs in mind, certain examples of the present disclosure provide a system including a memory, sensors, and a control unit including one or more processors configured to analyze data received from the memory and/or the sensors. The control unit may be an artificial intelligent control unit that may have decision authority and may make intelligent decisions based on the analysis of the data, for the modifications of vehicle system operating navigational protocols, for the communication of alerts or other notifications, or the like.

In one or more embodiments, the control unit may receive first data from the memory, and second data from the sensors. The first data may be associated with expected geospatial information (e.g., areas surrounding an airport), expected movement of a vehicle system (e.g., within different airways, based on different types or classifications of vehicle systems, based on expected track or runway layouts, etc.) The second data may be associated with actual movement of the vehicle system (e.g., within the different airways, based on the different types and/or classifications of vehicle systems, based on actual track or runway layouts, etc.). In at least one example, at least a portion of the second data may be transmitted from the vehicle system to one or more different ground control tools, control tower tools or systems, or the like.

In one or more embodiments, the control unit may analyze the first and second data, and determine one or more differences between the first and second data. If the differences determined between the first and second data are outside of a predetermined threshold, the control unit may initiate a responsive action. The responsive action may be to communicate a notification, such as to other vehicle systems or to an air traffic controller, to update a protocol for how to operate the vehicle system, or the like.

In at least one example, the control unit may analyze the first and second data based on the type and/or classification of the vehicle, such as fixed wing or non-fixed wing aircraft, types of engines or other propulsion systems, commercial versus governmental aircraft systems, etc.

In at least one example, the control unit may initiate a responsive action that may include communicating directions to the vehicle system to change movement of the vehicle system, to change a portion of the navigational protocol for the vehicle system (e.g., for other vehicle systems to follow), to communicate notification to other vehicle systems (e.g., notification of a change to the navigational protocol, an alert or warning to deviate from the navigational protocol, etc.), to update a portion of the first data with a corresponding portion of the second data (e.g., such as within the memory), to download and/or transmit data from the vehicle system (e.g., position data, operational data, control data, or the like), such as from the vehicle system to a ground control system, a control tower system, a remote control system, etc.

Certain examples of the present disclosure provide a method including receiving, by a control unit including one or more processors, first data corresponding to expected movement of a vehicle system; receiving second data associated with actual movement of the vehicle system; comparing the first data with the second data to determine one or more differences; determining whether the differences are outside of a designated threshold; and initiating a responsive action responsive to determining that the differences are outside of the designated threshold.

Certain examples of the present disclosure provide a non-transitory computer-readable storage medium comprising executable instructions that, in response to execution, cause one or more processors to receive first data corresponding to expected movement of a vehicle system; receive second data associated with actual movement of the vehicle system; compare the first data with the second data to determine one or more differences; determine whether the differences are outside of a designated threshold; and initiate a responsive action responsive to determining that the differences are outside of the designated threshold.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

In at least one example, systems and methods are configured to receive data associated with expected movement of aerial vehicles and data associated with actual movement of the aerial vehicles, and compare the expected versus actual movement of the vehicles to determine differences between the data. Examples of the subject disclosure provide systems and methods that allow for automatic identification of differences between expected movement of vehicles and actual movement of vehicles, and automatic updates to navigational protocols. For example, navigational protocols may be based on obsolete data, and the comparison of the actual movement of the vehicles with the expected movement of the vehicles according the obsolete data may indicate portions of the navigational protocols that need to be updated. The systems and methods of the subject matter disclosed effectively allow for the identification of errors of existing navigational protocols, and the removal and/or updates to the errors or obsolete information of the existing navigational protocols, such as to improve the safety of navigational protocols followed by vehicle operators.

Figure 1:
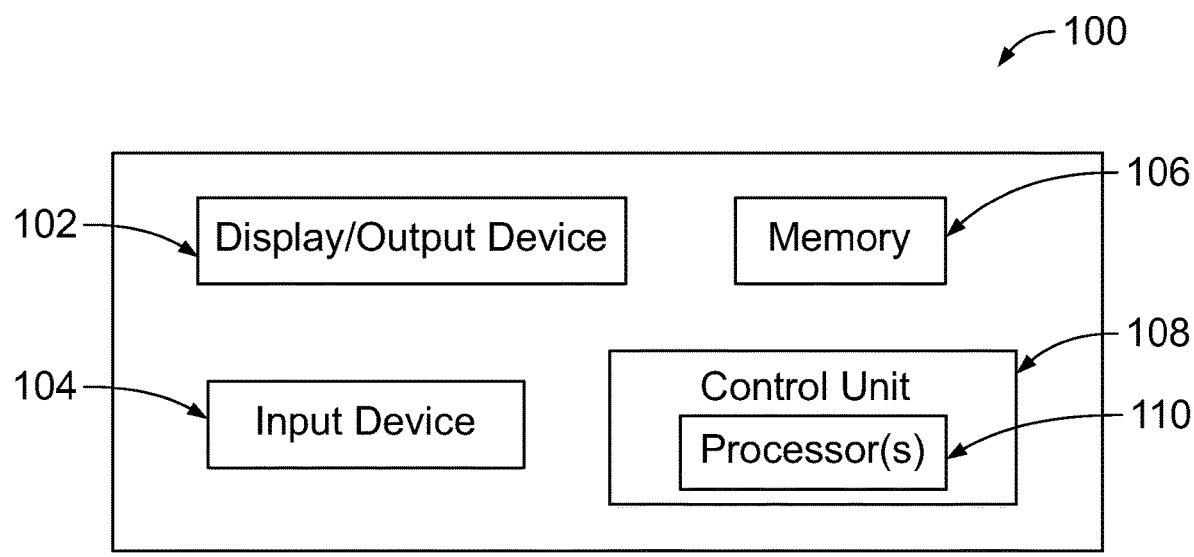
FIG. 1 illustrates a schematic block diagram of a system for validating vehicle system data, according to an example of the present disclosure.

FIG. 1 illustrates a schematic block diagram of a system 100 for validating data, according to an example of the present disclosure. The data that may be validated may be associated with movement of aerial vehicles within a determined distance of a landing area or landing space of the aerial vehicle, such as arrivals, approach and/or departure procedures, enroute airways (e.g., airways between airports, airways between departure and arrival locations, etc.), airspaces, a layout of a landing area (e.g., runways, landing pads, routes, tracks, or the like), or the like. While the subject matter described herein may be associated with aircraft and aerial vehicles, the vehicle systems may be non-aerial vehicles, such as trains, cars, buses, marine vessels, or the like.

As one example, the data may be associated with airways, standard instrument departures, standard arrivals, approach procedures, or the like, such as geospatial latitude and/or longitudinal locations for a related fixed or non-fixed (e.g., adjustable) components, devices, or the like, movement restrictions (e.g., directionality such as one-way movement restrictions, altitude, speed, restrictions based on time of day or day of the week, restrictions based on the type of vehicle system, or the like), turn radii, descent and/or climb profiles (e.g., continuous descent and/or climb, non-continuous descent and/or climb profiles, or the like), a frequency of use of the route or track (e.g., frequency based on type of vehicle system, frequency over a predetermined period of time, frequency of one route or track compared with a frequency of another route or track, or the like).

As another example, the data may be associated with discrete waypoints and/or fixed waypoints (e.g., discrete or fixed waypoints of an flight path, of vehicle locations, or the like), altitude restrictions (e.g., at a predetermined altitude, at or above a predetermined altitude, at or below a predetermined altitude, between two or more different predetermined altitudes, or the like), restricted airspaces (e.g., minimum and/or maximum altitudes, temporal constraints, or the like), controlled airspaces (e.g., speed limits, frequency of use, vehicle type restrictions, or the like), holding patterns and/or airport traffic patterns (e.g., altitude constraints, left or right turn directions, frequency of use of a holding pattern, or the like), missed approaches (e.g., frequency of how often an approach is missed, frequency of how often the approach is missed based on a type or classification of the vehicle system or other factors, or the like), or the like. As other examples, the data that is validated may be navigational instructions communicated to a pilot, such as from an air traffic controller, may be sensed data associated with how the vehicle was operated (e.g., GPS or other positioning data, speed data, or the like) compared with how the vehicle was expected to operate, may be how a pilot controls operation of the vehicle system compared with how a pilot is expected to control operation of the vehicle system, how a vehicle system is automatically controlled (e.g., without pilot intervention), or the like.

In one or more examples, the system may be disposed at an air traffic control tower, onboard one or more aerial vehicles, at an alternative off-board facility such as, but not limited to a governmental and/or private control center, or the like. In one or more examples, personnel operating the system may be pilots or flight attendants for an aircraft, air traffic control operators, or the like.

The system includes a control unit 108 in communication with a display or output device 102 and an input device 104, such as through one or more wired or wireless connections. The display or other output device may be an electronic monitor or screen, a touchscreen, a television, or the like. Optionally, the output device may be an audio output device, such as a speaker, or the like. The input device may be or include a keyboard, mouse, stylus, touchscreen interface, and/or the like. In at least one example, the display and input device are part of a computer workstation, such as can include the control unit 108. As another example, the system including the display and/or input device can be a handheld device, such as a smart phone, smart tablet, another portable system, or the like.

The system includes a memory 106 that may represent data storage and/or elements, that may store instructions, data, or other information as desired or needed. The memory may be in the form of an information source or a physical memory element within a processing machine. In one or more embodiments, the memory may be communicatively coupled with a memory cloud storage system, or other memory system outside of the system. For example, the memory of the data validation system may be capable of sending and/or receiving data from an alternative data storage system, such as a memory onboard an aircraft, a memory of a centralized database system, or the like.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In one or more examples, the control unit may be an artificial intelligent control unit. Beyond simple command and control, the artificial intelligent control unit in various embodiments assumes responsibility for certain tasks that require decision making. For example, the artificial intelligent control unit 108 may use information from the memory, from sensors (not shown), along with historic patterns, or the like, to make decisions regarding one or more states and/or actions related to the system.

The artificial intelligent control unit 108 includes one or more processors 110 that may perform operations of the system. In operation, the processors may receive information, such as from personnel operating the system via the input device, data stored within the memory, data from another external source (e.g., from sensors, other processing systems, or the like, communicatively coupled with the system via wired and/or wireless communication pathways, etc.), or the like. The processors may compare data, and may determine differences between the data, that may be displayed to an operator of the system. Optionally, the processors may communicate command messages that may include recommendations based on the comparison of the data. Optionally, the processors may recommend responsive actions that an operator and/or other systems of an aerial vehicle system may take based on the comparison. Optionally, the processors may direct the memory to update the stored data based on the data comparison. Optionally, the processors may communicate recommendations and/or command messages to other aerial vehicle systems.

As used herein, the term "control unit," "controller," "central processing unit," "CPU," "computer," or the like, may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 may be or include one or more processors that are configured to control operation, as described herein.

The diagrams of examples herein may illustrate one or more control or processing units, such as the control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 108 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

Examples of the subject disclosure provide systems and methods that allow large amounts of data to be quickly and efficiently analyzed by a computing device. For example, the control unit 108 can analyze various aspects of various flights of numerous aircraft. Further, the control unit 108 creates variables based on the various aspects, and validate and/or invalidate navigational data and/or protocols from the variables, which can be in a format not readily discernable by a human being. As such, large amounts of data, which may not be discernable by human beings, are being tracked and analyzed. The vast amounts of data are efficiently organized and/or analyzed by the control unit 108, as described herein. The control unit 108 analyzes the data in a relatively short time in order to quickly and efficiently validate and/or invalidate flight data in real time. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one embodiment, components of the system 100, such as the control unit 108, provide and/or enable a computer system to operate as a special computer system for validating and/or invalidating flight data of aircraft. The control unit 108 improves upon computing devices that use fuzzy logic by allowing for the creation of variables, which further allows for numerous additional flight data to be discerned.

Figure 2:
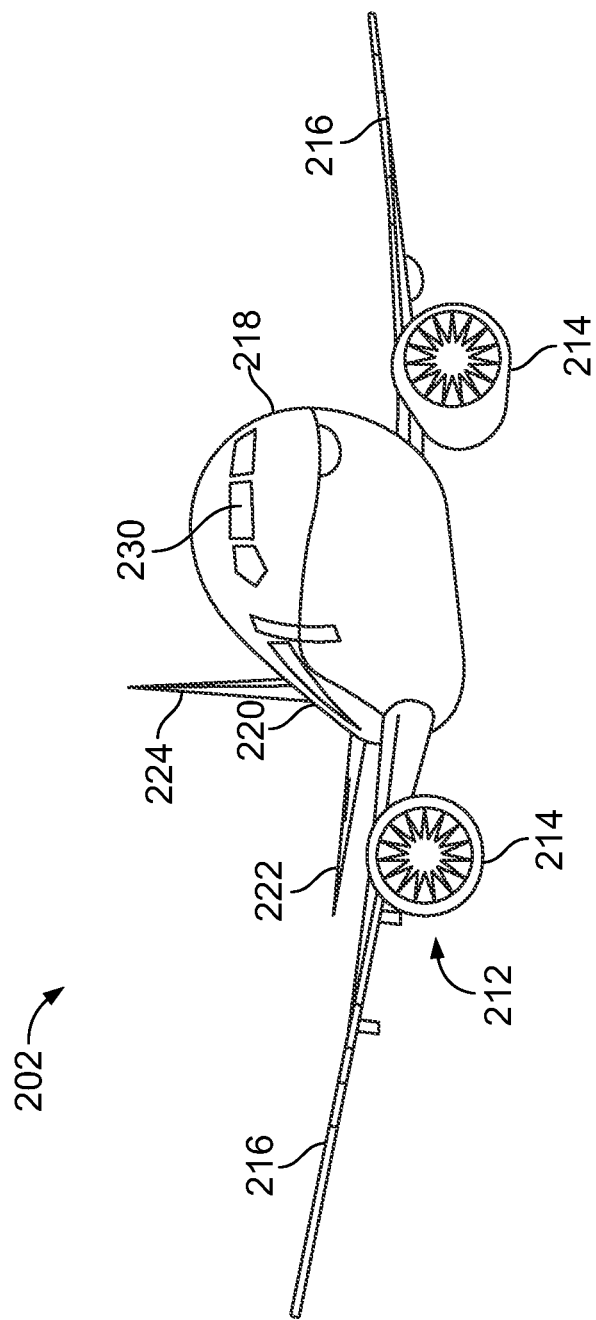
FIG. 2 illustrates a perspective view of an aircraft, according to an example of the present disclosure.

FIG. 2 illustrates a perspective front view of an aircraft 202, according to an example of the present disclosure. The aircraft 202 includes a propulsion system 212 that includes engines 214, for example. Optionally, the propulsion system 212 may include more engines 214 than shown. The engines 214 are carried by wings 216 of the aircraft 202. In other embodiments, the engines 214 may be carried by a fuselage 218 and/or an empennage 220. The empennage 220 may also support horizontal stabilizers 222 and a vertical stabilizer 224. The fuselage 218 of the aircraft 202 defines an internal cabin 230, which includes a flight desk or cockpit, one or more work stations (for example, galleys, personnel carry-on baggage areas, and the like), one or more passenger sections (for example, first class, business class, and coach sections), one or more lavatories, and/or the like. FIG. 2 shows an example of an aircraft 202. It is to be understood that the aircraft 202 can be sized, shaped, and configured differently than shown in FIG. 2.

Figure 3:
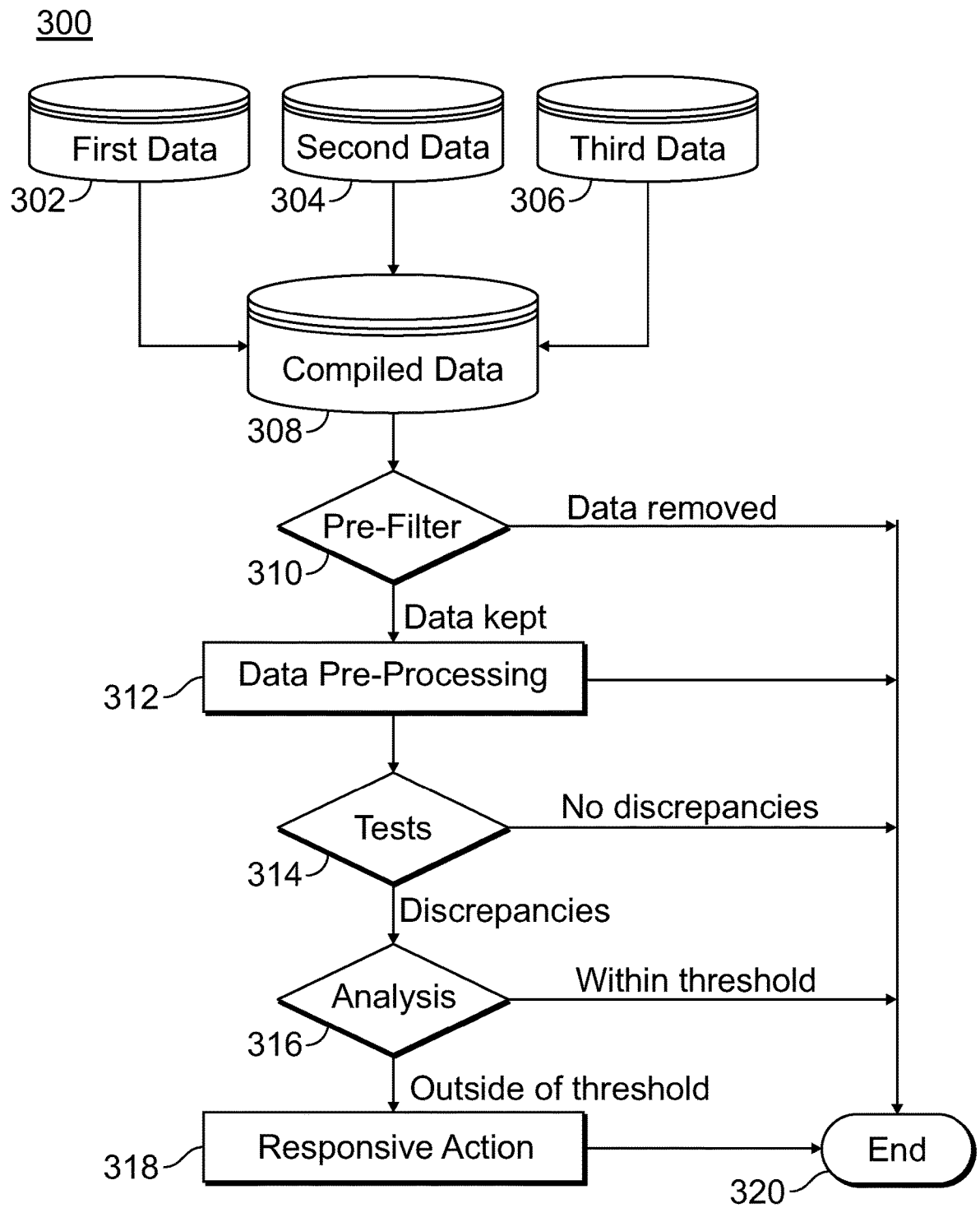
FIG. 3 illustrates a flow chart of a method for validating vehicle system data, according to an example of the present disclosure.

FIG. 3 illustrates a flow chart 300 of a method for validating vehicle system data, according to an example of the present disclosure. The flow chart may include one or more steps that may be completed concurrently with one or more other steps, may be eliminated from the process flow chart, or any combination therein.

At 302, first data may be obtained. In one example, the first data may be data that is stored, such as stored data within the memory of the system, data stored within a virtual cloud space, or the like. The first data may be associated with expected movement of the vehicle system, such as predetermined movement protocols, expected procedural instructions (e.g., received onboard the vehicle system, such as from an air traffic controller), or the like. The predetermined movement protocols, procedural instructions, or the like, may be based at least in part on historical movement data of vehicles of a same or similar classification (e.g., fixed wing aerial vehicles, non-fixed wing vehicles such as helicopters, drones, or the like, general aviation vehicles, business aviation vehicles, commercial aviation vehicles, governmental vehicles, size classifications, classifications based on engine type or other propulsion systems, or the like). For example, a movement protocol of a helicopter as an airport may differ from a movement protocol of a commercial aircraft at the same airport. As another example, the first data may be based on expected geospatial information in which the vehicle system moves. For example, the vehicle system may be expected to be operated and/or controlled in a particular manner based on assumptions or expectations of the geographical area in which the vehicle system is moving. In one or more examples, the first data may be based at least in part on historical data associated with movement of plural vehicle systems (e.g., plural different vehicle systems, plural vehicles of a similar type or classification, or the like). Optionally, the first data may be based on historical data previously collected or obtained over a predetermined length of time (e.g., data collected over 1 day, 1 month, 1 year, or the like).

At 304, second data may be obtained, collected, compiled, or the like. In one example, the second data may be obtained by sensors such as sensors onboard the vehicle system, sensors disposed offboard the vehicle systems, such as at locations around a landing location (e.g., at locations around an airport, along runways, or the like), or the like. As one example, the second data may be obtained or otherwise sensed by onboard sensors, and the second data may be compiled in an electric flight bag, onboard data recording device, or the like. The second data be associated with how the vehicle system actually operates. For example, the second data may include actual latitude and/or longitudinal information, speeds, accelerations, elevations, different elevations at different geospatial locations (e.g., at different locations along a runway, or the like), or the like. Optionally, the second data may include information associated with ambient conditions when the vehicle system was moving or operating (e.g., weather conditions, wind speeds, ambient temperatures, ambient humidity, ambient pressure, or the like). Optionally, the second data may include information associated with the type or classification of the vehicle system (e.g., fixed versus non-fixed wing aerial vehicles, commercial aviation vehicles, based on the type of engine or propulsion system, or the like).

As another example, the second data may be based on actual geospatial information in which the vehicle system actually moves. For example, the vehicle system may be operated and/or controlled in a particular manner based on the actual environment or actual geographical area in which the vehicle system is moving. As another example, the second data may be transmitted from the vehicle system and received by a ground network, a remote control network, or the like. For example, an aircraft system may actively transmit its position data (e.g., periodically, at predetermined times, at predetermined longitudinal and/or latitudinal positions, or the like) via one or more transponders of the vehicle system, and a ground network may collect the information transmitted by the vehicle system transponder. For example, an Automatic Dependent Surveillance-Broadcast (ADS-B) system may receive position data of the vehicle system that is actively and/or passively transmitted by the vehicle system (e.g., via a transponder of the vehicle system). As another example, another wayside device (e.g., tower sensors, runway sensors, or the like) may include a transponder, and may actively transmit vehicle system position data to the ground network, or another data collecting network.

In one or more examples, the second data may be collected over a predetermined length of time. For example, the second data may include data associated with a vehicle system landing and/or departing from an airport for a predetermined number of flights. Optionally, the second data may include data associated with plural different vehicle systems landing and/or departing from the same airport for a predetermined length of time (e.g., over about 24 hours, over about 7 days, over about 1 year, or the like). Optionally, the second data may be collected for a predetermined number of different vehicle systems of the same or similar classifications. For example, the second data may be compiled for movement of about 100 different commercial aerial vehicles, for about 50 different helicopters, for about 1000 different drones, or the like.

At 306, third data may be obtained, collected, compiled, or the like. In one example, the third data may capture or be associated with data not collected or omitted by the first and second data (e.g., where the first data is associated with expected movement of a vehicle system, and the second data is associated with actual movement of one or more vehicle systems). For example, the third data may be associated with airport ambient weather conditions, airport layouts, conditions surrounding an airport (e.g., geographic conditions such as mountains, bodies of water, or the like, rural or urban environments, or the like), or the like.

At 308, the first, second, and third data are compiled together and received by the control system. In one example, the processors of the control system may receive the first, second, and third data, and may correlate or separate at least some of the data into different groups. For example, the processors separate the data based on types or classifications of vehicle systems, based on different protocols associated with different classifications of vehicle systems, based on the airport, based on governmental geographic locations (e.g., county, city, state, country, continent, or the like), or the like. As another example, the processors may separate the data based on any alternative reasoning.

At 310, some of the data may be filtered and/or separated from the remaining data, and a determination is made whether at least some of the data is to be removed or discarded. For example, at least some of the first data may be associated with a first classification of aerial vehicle, and the processors may be validating data associated with vehicles of a different, second classification. The data associated with the first classification of aerial vehicles may be removed from the compiled data. For example, the removed data may be discarded, deleted, moved to a different memory storage location (e.g., in the memory of the system), or the like. As another example, the processors may be validating data associated with descending flight patterns of aerial vehicles arriving at an airport, and may separate or remove data that is not associated with descending flight patterns (e.g., data that is associated with ascending flight patterns, data associated with a different airport, or the like).

At 312, the portion of the data that remains (e.g., is not removed or discarded) may be filtered, pre-processed, or the like. As one example, the remaining portion of the data may further be separated into different categories or classifications. As another example, the remaining portion of the first data may be correlated with a corresponding remaining portion of the second data. For example, one portion of the first data that remains may be associated with movement protocols of a first type or classification of aerial vehicle, and one portion of the second data that remains may be associated with actual movement, movement instructions communicated to the first type or classification of aerial vehicle from an air traffic controller, or the like. The portion of the first data associated with the expected movement of the first type of aerial vehicle may be filtered to correspond with or be otherwise linked with the portion of the second data associated with the actual movement of the first type of aerial vehicle.

At 314, one or more tests or first analysis may be conducted on the data by the processors of the control system, and a determination is made whether the one or more tests result in one or more discrepancies between the first, second, and/or third data. As one example, the tests may be a comparison between first data and the corresponding second data and/or third data. As another example, the tests may be a review of the first, second, and/or third data, such as to determine whether the control system has obtained all of the relevant first, second, and/or third data. If the result of the initial tests, reviews, or the like, do not result or indicate any discrepancies, such as between the first, second, and/or third data, then flow of the method proceeds toward 320, and the validation of the first, second, and/or third data is completed. Alternatively, if the initial tests, reviews, or the like, indicate one or more discrepancies between the first, second, and/or third data, then flow of the method proceed toward 316.

At 316, the processors may analyze the corresponding first, second, and/or third data. In one or more examples, the data may be analyzed by comparing at least some of the first data with corresponding second and/or third data. As another example, the data may be analyzed by completing one or more mathematical principles with the corresponding data. At 316, if the analysis of the data indicates that the one or more differences between the first, second, and/or third data are within a predetermined designated threshold, then flow of the method proceeds toward 320, and the validation of the first, second, and/or third data is completed. Alternatively, analysis of the first, second, and/or third data may indicate that one or more differences between the first, second, and/or third data are outside of the predetermined designated threshold. If the differences are outside of the designated threshold, flow of the method proceeds toward 318.

In one or more examples, the designated threshold(s) may be based on minimum and/or maximum restrictions, such as minimum and/or maximum altitudes within an airspace, minimum and/or maximum speed limits, left or right turn directions (e.g., within holding patterns, at an airport, or the like), a maximum number of missed approaches (e.g., a frequency of how often a missed approach is used as published, such as in an aircraft protocol), a maximum amount of time vehicles of a particular type or classification are within a controlled or restricted airspace, or the like. For example, the processors may analyze first data associated with expected movement of the vehicle system, such as based on the protocol for the vehicle system, based on instructions communicated by the air traffic controller, or the like, with second data associated with actual movement of the vehicle system.

For example, the processors may analyze whether the protocol (e.g., the first data) instructs the vehicle system to have a continuous descent at predetermined speeds and/or decelerations into an airport, but alternatively the vehicle system deviated from the protocol such as by operating at a non-continuous descent, operate at speeds and/or decelerations that differ from the protocol, or the like (e.g., the second data. As another example, the processors may analyze whether the protocol (e.g., the first data) instructs the vehicle to turn left within a holding pattern before the vehicle was allowed to descend, but alternatively the air traffic controller instructed the pilot to turn right within the holding pattern (e.g., the second data). Optionally, the processors may analyze whether the air traffic controller instructed the pilot to deviate from the left turn protocol instructions, such as based on weather conditions, air traffic congestion within a predetermined area of the holding pattern airspace, or the like (e.g., third data).

If the processors determine that the first data deviates from the second data by an amount (e.g., difference in control settings, frequency of deviations, or the like) that is outside of a designated threshold, flow of the method proceeds toward 318.

At 318, a responsive action is initiated, such as automatically by the control system, manually by an operator of the vehicle system and/or an air traffic controller, or any combination therein. As one example, the responsive action may include the control system automatically communicating command messages or instructions to the vehicle system or to the operator of the vehicle system to change movement of the vehicle system. As another example, the responsive action may be for the control system to communicate a command message to an owner of a protocol to update the protocol for operating the vehicle system. As another example, the responsive action may include communicating a notification, such as an alert, to other vehicle systems (e.g., other vehicle systems of the same or similar type or classification, other vehicle systems within a determined distance from an airspace and/or moving toward the airspace, or the like). The alert may be notification only and/or may include instructions for the operator of the vehicle system to change a control setting of the other vehicle systems, such as to deviate from an operating protocol.

In one or more examples, the responsive action may be to update the first data stored within the memory with at least a portion of the second data responsive to determining that the differences between the first and second data are outside of the designated threshold. For example, the processors may determine that the first data is no longer relevant, is out of date, or the like, and may replace a portion of the first data stored within the memory with at least some of the second data.

In one or more examples, the processors may determine that at least some first data, such as first data that should correspond with at least some of the second data, is missing from the memory. For example, the memory may exclude historical movement information associated with a particular type or classification of aerial vehicle, the memory may not have historical movement information associated with a restricted or controlled airspace, or the like. The responsive action may include directing the memory to store the second data the corresponds with the portion of the first data that is missing, excluded, omitted, or the like.

Further, the disclosure comprises examples according to the following clauses:

Clause 1: a method comprising:
receiving, by a control unit, first data stored within a memory, the first data associated with expected movement of a vehicle system;
receiving, by the control unit, second data from one or more sensors, the second data associated with actual movement of the vehicle system;
comparing, by the control unit, the first data with the second data to determine one or more differences between the first data and the second data; and
initiating a responsive action, by the control unit, responsive to determining that at least one of the one or more differences is outside of a designated threshold.

Clause 2: the method of clause 1, wherein the first data and the second data is based on a classification of the vehicle system.

Clause 3: the method of clauses 1 or 2, wherein initiating the responsive action includes updating the first data stored in the memory with the second data responsive to determining that the at least one of the one or more differences is outside of the designated threshold.

Clause 4: the method of clauses 1-3, wherein initiating the responsive action includes one or more of communicating directions to the vehicle system to change movement of the vehicle system, or changing one or more protocols for controlling future movement of the vehicle system.

Clause 5: the method of clauses 1-4, further comprising communicating a notification to one or more other vehicle systems responsive to initiating the responsive action.

Clause 6: the method of clauses 1 or 5, wherein the vehicle system and the one or more other vehicle systems have a same classification.

Clause 7: the method of clauses 1-6, wherein the first data is based at least in part on expected geospatial information in which the vehicle system moves, and the second data is based on actual geospatial information in which the vehicle system moves.

Clause 8: the method of clauses 1-7, further comprising identifying one or more discrepancies of the first data based on the comparison of the first data with the second data.

Clause 9: the method of clauses 1-8, further comprising:
determining, by the control unit, that at least some of the first data is missing from the memory; and
directing the memory to store the second data corresponding to the at least some of the first data that is missing.

Clause 10: the method of clauses 1-9, wherein the first data is based at least in part on historical data associated with movement of plural vehicle systems over a predetermined length of time.

Clause 11: the method of clauses 1-10, wherein the first data is stored within the memory based on the classification of the vehicle system.

Clause 12: a system comprising:
a control unit including one or more processors configured to receive the first data from a memory and second data from one or more sensors, the first data associated with expected movement of a vehicle system, the second data associated with actual movement of the vehicle system, the control unit configured to compare the first data with the second data to determine one or more differences between the first data and the second data,
the control unit configured to initiate a responsive action responsive to determining that at least one of the one or more differences is outside of a designated threshold.

Clause 13: the system of clause 12, wherein the responsive action includes one or more of updating the first data stored in the memory with the second data responsive to determining that the at least one of the one or more differences is outside of the designated threshold.

Clause 14: the system of clauses 12 or 13, wherein the control unit is configured to communicate a notification to one or more other vehicle systems responsive to initiating the responsive action, wherein the vehicle system and the one or more other vehicle systems have a same classification.

Clause 15: the system of clauses 12-14, wherein the first data is based at least in part on expected geospatial information in which the vehicle system moves, and the second data is based on actual geospatial information in which the vehicle system moves.

Clause 16: the system of clauses 12-15, wherein the control unit is configured to identify one or more discrepancies of the first data based on the comparison of the first data with the second data.

Clause 17: The system of clauses 12-16, wherein the vehicle system is an aerial vehicle system, and the first data is associated with the expected movement of the aerial vehicle system within a determined distance of a landing space of the aerial vehicle system.

Clause 18: the system of clauses 12-17, wherein the control unit is configured to determine that at least some of the first data is missing from the memory, the control unit configured to direct the memory the second data corresponding to the at least some of the first data that is missing.

Clause 19: the system of clauses 12-18, wherein the first data is based at least in part on historical data associated with movement of plural vehicle systems over a predetermined length of time.

Clause 20: A non-transitory computer-readable storage medium comprising executable instructions that, in response to execution, cause one or more processors to perform the operations comprising:
receiving first data stored within a memory, the first data associated with expected movement of an aerial vehicle system within a determined distance of a landing space of the aerial vehicle system;
receiving second data from one or more sensors, the second data associated with actual movement of the aerial vehicle system within the determined distance of the landing space of the aerial vehicle system;
comparing the first data with the second data to determine one or more differences between the first data and the second data; and
initiating a responsive action responsive to determining that at least one of the one or more differences is outside of a designated threshold, wherein initiating the responsive action includes one or more of updating the first data stored in the memory with the second data responsive to determining that the at least one of the one or more differences is outside of the designated threshold, communicating directions to the aerial vehicle system to change movement of the aerial vehicle system, or changing one or more protocols for controlling future movement of the aerial vehicle system.

As described herein, examples of the present disclosure provide systems and methods for efficiently and effectively scheduling resources, such as for trips (for example, flights, train or bus journeys, and/or the like). Further, examples of the present disclosure provide systems and methods that improve efficiency of business rules engine methods for determining schedules.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:
   receiving, by a control unit, first navigational data stored within a memory, the first navigational data associated with expected directional movement of a vehicle system within a determined distance of a landing space of the vehicle system;
   receiving, by the control unit, second navigational data from one or more sensors, the second navigational data associated with actual directional movement of the vehicle system within the determined distance of the landing space of the vehicle system;
   comparing, by the control unit, the first navigational data with the second navigational data to determine one or more differences between the first navigational data and the second navigational data;
   automatically updating information stored within the memory, by the control unit, with at least some of the second navigational data responsive to determining that at least one of the one or more differences is outside of a designated threshold;
   automatically controlling operation of the vehicle system to change one or more operational settings of the vehicle system based at least in part on the updated information stored within the memory; and
   wirelessly communicating the updated information stored within the memory with one or more other vehicle systems, wherein the updated information is configured to provide instructions for how the one or more other vehicle systems are to move within the determined distance of the landing space of the vehicle system.

2. The method of claim 1, wherein the first navigational data and the second navigational data is based on a classification of the vehicle system.

3. The method of claim 1, further comprising changing one or more protocols stored within the memory for controlling future movement of the vehicle system within the determined distance of the landing space of the vehicle system.

4. The method of claim 1, wherein the vehicle system and the one or more other vehicle systems have a same classification.

5. The method of claim 1, wherein the first navigational data is based at least in part on expected geospatial information in which the vehicle system moves, and the second navigational data is based on actual geospatial information in which the vehicle system moves within the determined distance of the landing space of the vehicle system.

6. The method of claim 1, further comprising identifying one or more discrepancies of the first navigational data based on the comparison of the first navigational data with the second navigational data.

7. The method of claim 1, further comprising:
   determining, by the control unit, that at least some of the first navigational data is missing from the memory; and
   directing the memory to store the second navigational data corresponding to the at least some of the first navigational data that is missing.

8. The method of claim 1, wherein the first navigational data is based at least in part on historical data associated with movement of plural vehicle systems over a predetermined length of time within the determined distance of the landing space of the vehicle system.

9. The method of claim 1, wherein the first navigational data is stored within the memory based on the classification of the vehicle system.

10. A system comprising:
    a control unit including one or more processors configured to receive the first navigational data from a memory and second navigational data from one or more sensors, the first navigational data associated with expected directional movement of a vehicle system within a determined distance of a landing space of the vehicle system, the second navigational data associated with actual directional movement of the vehicle system within the determined distance of the landing space of the vehicle system, the control unit configured to compare the first navigational data with the second navigational data to determine one or more differences between the first navigational data and the second navigational data,
    the control unit configured to automatically update information stored within the memory with at least some of the second navigational data responsive to determining that at least one of the one or more differences is outside of a designated threshold, and
    wherein the control unit is configured to wirelessly communicate the updated information stored within the memory with one or more other vehicle systems.

11. The system of claim 10, wherein the vehicle system and the one or more other vehicle systems have a same classification.

12. The system of claim 10, wherein the first navigational data is based at least in part on expected geospatial information in which the vehicle system moves, and the second navigational data is based on actual geospatial information in which the vehicle system moves within the determined distance of the landing space of the vehicle system.

13. The system of claim 10, wherein the control unit is configured to identify one or more discrepancies of the first navigational data based on the comparison of the first navigational data with the second navigational data.

14. The system of claim 10, wherein the vehicle system is an aerial vehicle system, and the first data is associated with the expected directional movement of the aerial vehicle system within the determined distance of the landing space of the aerial vehicle system.

15. The system of claim 10, wherein the control unit is configured to determine that at least some of the first navigational data is missing from the memory, the control unit configured to direct the memory to store the second navigational data corresponding to the at least some of the first navigational data that is missing.

16. The system of claim 10, wherein the first navigational data is based at least in part on historical data associated with movement of plural vehicle systems over a predetermined length of time within the determined distance of the landing space of the vehicle system.

17. A non-transitory computer-readable storage medium comprising executable instructions that, in response to execution, cause one or more processors to perform the operations comprising:
- receiving, by a control unit, first navigational data stored within a memory, the first navigational data associated with expected directional movement of an aerial vehicle system within a determined distance of a landing space of the aerial vehicle system;
- receiving, by the control unit, second navigational data from one or more sensors, the second navigational data associated with actual directional movement of the aerial vehicle system within the determined distance of the landing space of the aerial vehicle system;
- comparing, by the control unit, the first navigational data with the second data to determine one or more differences between the first navigational data and the second navigational data;
- updating the first navigational data stored in the memory with the second navigational data responsive to determining that the at least one of the one or more differences is outside of a designated threshold;
- automatically controlling operation of the aerial vehicle system to change one or more operational settings of the aerial vehicle system based at least in part on the updated navigational data stored within the memory;
- wirelessly communicating directions to the aerial vehicle system by the control unit to change movement of the aerial vehicle system, or
- automatically updating, by the control unit, one or more protocols stored within the memory for controlling future movement of the aerial vehicle system and one or more other aerial vehicle systems; and
- wirelessly communicating the one or more protocols that are updated with the one or more other aerial vehicle systems.

18. The system of claim 10, wherein the control unit is configured to be disposed off-board the vehicle system and is configured to wirelessly communicate with the vehicle system.

19. The method of claim 1, wherein updating the information stored within the memory includes updating one or more of positional or orientation discrepancies between the expected directional movement of the vehicle system and the actual directional movement of the vehicle system.

20. The system of claim 10, wherein the control unit is configured to automatically update information stored within the memory based on one or more of positional or orientation discrepancies between the expected directional movement of the vehicle system and the actual directional movement of the vehicle system.

* * * * *